US008311226B2

(12) United States Patent
Lorgeoux et al.

(10) Patent No.: US 8,311,226 B2
(45) Date of Patent: Nov. 13, 2012

(54) METHOD FOR ASSIGNING A PLURALITY OF AUDIO CHANNELS TO A PLURALITY OF SPEAKERS, CORRESPONDING COMPUTER PROGRAM PRODUCT, STORAGE MEANS AND MANAGER NODE

(75) Inventors: Mickaël Lorgeoux, Rennes (FR); Francois Thoumy, Vignoc (FR)

(73) Assignee: Canon Kabushiki Kaisha, Tokyo (JP)

( * ) Notice: Subject to any disclaimer, the term of this patent is extended or adjusted under 35 U.S.C. 154(b) by 1268 days.

(21) Appl. No.: 12/054,935

(22) Filed: Mar. 25, 2008

(65) Prior Publication Data

US 2008/0253575 A1     Oct. 16, 2008

(30) Foreign Application Priority Data

Apr. 13, 2007   (FR) ...................... 07 02709

(51) Int. Cl.
- H04H 20/47    (2008.01)
- H04H 20/88    (2008.01)
- H04H 40/36    (2008.01)
- H04B 3/00     (2006.01)

(52) U.S. Cl. ............................................. 381/2; 381/81
(58) Field of Classification Search ............... 381/2, 80, 381/81, 58, 59, 300, 307; 700/94
See application file for complete search history.

(56) References Cited

U.S. PATENT DOCUMENTS

| | | | | |
|---|---|---|---|---|
| 6,091,826 A | * | 7/2000 | Laitinen et al. .................. | 381/82 |
| 6,954,471 B1 | | 10/2005 | Rousselin et al. ............ | 370/503 |
| 7,058,005 B2 | | 6/2006 | Ehrmann-Patin et al. .... | 370/208 |
| 2004/0071294 A1 | | 4/2004 | Halgas, Jr. et al. ............. | 381/59 |
| 2005/0141724 A1 | | 6/2005 | Hesdahl ........................ | 381/58 |
| 2005/0152557 A1 | | 7/2005 | Sasaki et al. ................... | 381/58 |
| 2006/0205349 A1 | * | 9/2006 | Passier et al. ................ | 455/41.2 |

FOREIGN PATENT DOCUMENTS

| | | |
|---|---|---|
| FR | 2 850 183 A1 | 1/2003 |
| WO | WO 03/088711 A2 | 10/2003 |
| WO | WO 2006131894 A2 * | 12/2006 |

OTHER PUBLICATIONS

Humphrey, R., "Automatic Loudspeaker Location Detection for Use in Ambisonic Systems," Masters thesis submitted to The University of York, Aug. 1, 2006, pp. 0-189.

* cited by examiner

*Primary Examiner* — Hai Phan
(74) *Attorney, Agent, or Firm* — Fitzpatrick, Cella, Harper & Scinto

(57) ABSTRACT

A method for assigning audio channels of audio data content to speakers, each of which is associated with a different one of N speaker nodes of a wireless network. The method is performed by a manager node of the wireless network. The method includes, for each of the N speaker nodes, obtaining a piece of orientation information for each of N−1 other speaker nodes different from the given speaker node, regarding an orientation of a reception antenna of the given speaker node when receiving data sent by each of the N−1 other speaker nodes through the wireless network. The method also includes assigning a different one of the audio channels to a different one of the speaker nodes, as a function of N−1 pieces of orientation information obtained for each of the N speaker nodes.

15 Claims, 5 Drawing Sheets

Fig. 4A — Transmission WAS / WAS en réception

| | WAS100 | WAS200 | WAS300 | WAS400 | WAS500 | WAS600 | WAS700 |
|---|---|---|---|---|---|---|---|
| WAS100 | NA | -14 | 0 | 117 | 34 | 89 | 62 |
| WAS200 | 165 | NA | 14 | 132 | 48 | 104 | 77 |
| WAS300 | 180 | 194 | NA | 146 | 63 | 118 | 90 |
| WAS400 | 27 | 42 | 51 | NA | 90 | 118 | 118 |
| WAS500 | 123 | 138 | 152 | 90 | NA | 145 | 34 |
| WAS600 | 89 | 103 | 118 | 56 | 151 | NA | 180 |
| WAS700 | 62 | 76 | 90 | 29 | 124 | 0 | NA |

Fig. 4B — Transmission WAS / WAS en réception

| | WAS100 | WAS200 | WAS300 | WAS400 | WAS500 | WAS600 | WAS700 |
|---|---|---|---|---|---|---|---|
| WAS100 | NA | -104 | -90 | 27 | -56 | -1 | -28 |
| WAS200 | 75 | NA | -76 | 42 | -42 | 14 | -13 |
| WAS300 | 90 | 104 | NA | 56 | -27 | 28 | 0 |
| WAS400 | -63 | -48 | -39 | NA | 0 | 55 | 28 |
| WAS500 | 33 | 48 | 62 | -34 | NA | -28 | -56 |
| WAS600 | -1 | 13 | 28 | -61 | 61 | NA | 90 |
| WAS700 | -28 | -14 | 0 | -61 | 34 | -90 | NA |

Fig. 4C

| - | + | Σ |
|---|---|---|
| -104 | 27 | 131 |
| -76 | 75 | 151 |
| -27 | 104 | 131 |
| -63 | 55 | 118 |
| -56 | 62 | 118 |
| -34 | 90 | 124 |
| -90 | 34 | 124 |

METHOD FOR ASSIGNING A PLURALITY OF AUDIO CHANNELS TO A PLURALITY OF SPEAKERS, CORRESPONDING COMPUTER PROGRAM PRODUCT, STORAGE MEANS AND MANAGER NODE

1. FIELD OF THE INVENTION

The field of the invention is that of wireless networks for the distribution of audio contents.

The invention relates especially but not exclusively to home cinema type systems comprising wireless speakers.

2. PRIOR ART SOLUTIONS

A typical 7.1 type multi-channel home cinema comprises inter alia a multi-channel audio-video amplifier associated with eight speakers.

For example, the multi-channel audio-video amplifier receives a digital audio content coming from a source terminal such as a DVD player, a digital television set or a sink terminal (or STB for "a set top box"), for example, via satellite, cable, xDSL (x digital subscriber line technologies such as for example ADSL technology), etc. The audio-video amplifier and the source terminal are generally interconnected by means of a digital audio (or audio-video) interface compliant with the SPDIF ("Sony/Philips Digital Inter-Face"), the IEEE-1394 standard or the HDMI ("High Definition Multimedia Interface") standard.

After reception of the content, the audio-video amplifier decodes the audio data of the content and demultiplexes this data in the different audio channels. Then it performs a digital/analog conversion and finally amplifies each audio channel in order to feed each associated speaker.

In a 7.1 type home cinema network, the figure "7" is dedicated to the C (or Center) speaker, also called the FC (Front Center) speaker and the FL (Front Left), FR (Front Right), SL (Surround Left), SR (Surround Right), RL (Rear Left) and RR (Rear Right) speakers. The speakers are generally connected to the outputs of the audio-video amplifier by means of two-wired analog cables. The figure "1" is dedicated to a particular speaker called a subwoofer or SW speaker. The subwoofer is generally connected to the amplifier by means of a coaxial analog cable. The subwoofer is dedicated to the amplification and to the reproduction of low-frequency audio signals.

To prevent the implementation of many, bulky analog cables to interconnect the amplifier and the speakers, manufacturers have recently developed wireless home-cinema networks. In these home-cinema networks, the audio amplification stage is decentralized (a wireless home-cinema network no longer requires the implementation of a central audio-video amplifier as in the case of a wire network) and is integrated into each speaker. A 7.1 wireless home-cinema network comprises a wireless surround controller node hereinafter called a WSC node and first, second, third, fourth, fifth, sixth, seventh and eighth wireless active speakers hereinafter called WAS (wireless active speaker) nodes.

Here below, the term WAS node is understood to mean the association of amplification means, wireless communication means and means for the processing of information received or sent by the wireless communication means and possibly a classic speaker (the speaker may be external to the WAS node).

For example, the WSC node receives a digital audio content coming from a source terminal such as a DVD player, a digital television set or reception terminal, for example via satellite, cable, xDSL technologies etc. The WSC node and the source terminal are generally connected by means of a digital audio (or audio-video) interface compliant with the SPDIF, the IEEE-1394 standard or the HDMI standard.

After reception of the content, the WSC node decodes the audio data of the content and demultiplexes this data on the different audio channels. Then it sends the audio data from each audio channel to the appropriate WAS node via the wireless home-cinema network. The wireless communications means in a wireless home-cinema network of this kind are classically infrared type or RF (radio-frequency) type links.

Each WAS node receives the digital audio data corresponding to its audio channels coming from the WSC node. Then each WAS node carries out a digital/analog conversion, amplifies its audio data and converts it into an acoustic signal.

Consumer demand with respect to audio devices has moved on from two-speaker hi-fi stereo systems to multi-channel home cinema systems comprising up to eight speakers. In the case of wire-based systems, this increase in the number of speakers may lead the user to commit connection errors resulting in a situation where audio channels are wrongly assigned to different speakers. In a conventional wire-based home cinema network, the allocation of the audio channels is done by the user when he connects each cable of the speaker to the appropriate output of the amplifier.

For example, in the case of a 7.1 type wire-based home cinema network, the amplifier comprises an output dedicated to each audio channel; namely the FL (Front Left), FR (Front Right), C (Center) also called FC (Front Center), SL (Surround Left), SR (Surround Right), RL (Rear Left), RR (Rear Right) and SW (SubWoofer).

When installing a 7.1 type wire-based home cinema network, if the user makes a mistake in the connection of the speaker cables to the outputs of the amplifier, then the acoustic effect produced by the 7.1 system will not have the planned effect.

In the case of a wireless home cinema network, the assigning of the C, FL, FR, SL, SR, RL, RR and SW channels to the speakers (or WAS nodes) has to be done differently. Before sending digital audio data from a given audio channel to the appropriate WAS node, the WSC node must preliminarily identify this appropriate WAS node.

A first possible solution to doing this is to assign an identification number or name to each WAS node at the time of manufacture. Thus, when the home cinema network is installed, the user must follow the manufacturer's recommendations and place each WAS node in the room according to its identification number or name. When the system is powered on, the WSC node sends digital audio data from a given audio channel to the appropriate WAS node according to a pre-recorded table which associates an audio channel with a given identification number or name. From a production viewpoint, the assigning of an identification name or number to each WAS node requires time and is difficult to implement in the factory (it entails assigning an identification number or name to each WAS node and appropriate packaging when it is far simpler to manufacture only one type of WAS node). Furthermore, this first solution requires action by the user who can make mistakes when he lays out the WAS nodes in the room.

A second possible approach lies in the performance of a learning phase during the first operation for powering on the system. In this learning phase, the WSC node classically sends an acoustic test signal to the current WAS node. In the meantime, the user assigns the current WAS node a piece of information on the position of the current WAS node by means of a man/machine interface (for example an OSD or on-screen display). Then the operation is repeated for each WAS node. Thus, the WSC node learns which WAS node is the C, FL, FR, SL, SR, RL, RR or SW speaker. When the learning phase is completed, the WSC node is able to assign each audio channel (namely the C, FL, FR, SL, SR, RL, RR, or SW channel) to the appropriate WAS node. This second approach is not satisfactory because it necessitates action by the user and the use of a specific man/machine interface. Furthermore, with this second approach, the user can make errors of assignment during the learning phase.

The American patent document No. US2005141724A1 by Philips Electronics North America Corporation (registered mark) describes a third approach implemented in a home cinema network based on powerline network technology. In this home cinema network which can be likened to a wireless home cinema network (the amplification stage is decentralized in each speaker and each speaker is not connected to an output of the amplifier), each speaker has an integrated position sensor which is a GPS by which it can determine and transmit its position to the WSC node (via the powerline network). However, this third approach, based on powerline network technology, necessitates the integration of a position sensor into each speaker, thus making it a space-consuming and costly solution. Furthermore, the lack of precision of a GPS with respect to the position measured gives rise to high risks of error in the assigning of the audio channels to the speakers. Finally, the walls of the house and the furniture in particular may adversely affect communications between the satellites and the GPS units incorporated into the speakers.

3. GOALS OF THE INVENTION

The invention, in at least one embodiment, is aimed especially at overcoming these drawbacks of the prior art.

More specifically, it is a goal of the invention, in at least one of its embodiment, to provide a technique, in a wireless network for the distribution of audio contents comprising a plurality of speaker nodes (i.e. nodes comprising a speaker or associated with a speaker), that enables the assigning of the audio channels to the speakers of the speaker nodes or associated with the speaker nodes and does not require action by a user.

It is another goal of the invention, in at least one of its embodiments, to implement a technique of this kind that enables the use of speaker nodes that are strictly identical and therefore interchangeable.

It is yet another goal of the invention, in at least one of its embodiments, to implement a technique of this kind that is simple to implement and costs little.

4. SUMMARY OF THE INVENTION

A particular embodiment of the invention proposes a method for assigning a plurality of audio channels of an audio data content to a plurality of speakers, each of the speakers being associated with a distinct node, called a speaker node, of a wireless network for the distribution of audio data contents, in the context of the diffusion of audio data content by a node, called a diffusion node, of the distribution network, said method being implemented by a node, called a manager node, of the distribution network.

According to the invention, the assigning method comprises the following steps for each speaker node, called a first speaker node:

the obtaining, for each speaker node, except the first speaker node, called a second speaker node, of a piece of information on orientation of said reception antenna of said first speaker node, said antenna being adapted to the reception of data sent by the second speaker node through the wireless network for distribution of audio data contents;

the assigning of one of the audio channels of said plurality of audio channels as a function of said piece of information obtained on orientation.

The general principle of the invention is based on the obtaining of information on orientation of an antenna of each speaker node (comprising or associated with a speaker) of the distribution wireless network when the antenna is adapted to the reception of data sent out by each of the other speaker nodes of the network. These pieces of information are then used to assign the audio channels to the speakers of the speaker nodes (or associated with the speaker nodes) of the wireless distribution network. Indeed, the antenna orientation information obtained is used to determine a relative position of the speakers of the speaker nodes of the network, and thus a determined speaker node in the network (or more specifically its speaker) can be assigned a determined audio channel.

Thus, the invention provides a technique for assigning audio channels to the speaker nodes that does not require action by the user.

Furthermore, the invention in at least one of its embodiments enables the use of speaker nodes that are strictly identical and therefore interchangeable.

Preferably, the assigning method furthermore comprises the following steps:

first identification of one of said speaker nodes, called an identified speaker node, to which one of said audio channels, called an identified audio channel, must be assigned as a function of said information on orientation obtained;

for each of said speaker nodes, except the identified speaker node, second identification of said speaker node to which one of said audio channels must be assigned depending on said pieces of information on orientation obtained and on the identified speaker node.

Thus, after the first identification has been made, the second identifications are simpler to implement because the number of speaker nodes not yet identified is restricted.

Advantageously, said identified speaker node is situated on an axis of symmetry of said distribution network.

Thus, it is easy to implement the first identification because of the presence of the axis of symmetry.

Preferably, if several speaker nodes are situated on the axis of symmetry of said distribution network, the method comprises a step for the obtaining, for each of the speaker nodes situated on said axis of symmetry, of a parameter indicating the reception level, by the manager node, of data sent by said speaker node situated on said axis of symmetry, and the manager node performs the step of first identification depending on said parameters obtained.

Thus, the identified speaker node is obtained by means of a criterion of level of reception by the manager node. Naturally, any other technique for selecting a node among the nodes on the axis of symmetry may be implemented in the context of the invention.

Preferably, said audio data content distribution network is a home cinema type of network and said identified speaker is the speaker node associated with the speaker that has to restitute the front-centre channel of said home cinema network.

Advantageously, for each speaker node, said reception antenna of said speaker node is a directional antenna whose radiation pattern is oriented along an axis of radiation, said piece of information on orientation of the reception antenna of a first speaker node, the antenna being adapted to the reception of data transmitted by a second speaker node, is the angle formed by the axis of radiation of the reception antenna and a predetermined angle reference axis,
the step of first identification comprises a sub-step of determination, from angles obtained for each speaker node, of a speaker node with a maximum difference between a maximum signed angle value and a minimum signed angle value.

Indeed, in following the recommendations of the ITU-R BS.775-2 standard and the recommendations of the Dolby Laboratories, the speaker having to restitute the front-centre channel of a home cinema system has a maximum difference of angle with the speakers adjacent to it, i.e. the speakers having to restitute the front-left and front-right channels of the home cinema system. It is then possible, according to the invention, to identify the speaker node with which the speaker having to restitute the front-left and front-right channels of the home cinema system is associated, this speaker node having a maximum difference between a maximum signed angle value and a minimum signed angle value of orientation of its reception antenna.

Preferably, for each speaker node, said reception antenna of said speaker node is a directional antenna whose radiation pattern is oriented along an axis of radiation,
said piece of information on orientation of the reception antenna of a first speaker node, the antenna being adapted to the reception of data transmitted by a second speaker node, is the angle formed by the axis of radiation of the reception antenna and a sound diffusion axis of the speaker associated with it,
the step of first identification comprises a sub-step of determination, from angles obtained for each speaker node, of a speaker node for which the angles obtained are substantially symmetrical relative to the axis of sound diffusion of the speaker associated with it.

Indeed, in following the recommendations of the ITU-R BS.775-2 standard and the recommendations of the Dolby Laboratories, the speaker that has to restitute the front-centre channel of a home cinema system is situated on an axis of symmetry of a home cinema system. It is then possible, according to the invention, to identify the speaker node with which the speaker having to restitute the front-center channel is associated, its angles of reception of its reception antenna being substantially symmetrical relative to the sound diffusion axis of its speaker.

The invention also relates to a computer program product downloadable from a communications network and/or recorded on a computer-readable carrier and/or executable by a processor, characterized in that it comprises program code instructions for the implementation of the assigning method as described here above.

The invention also relates to a computer-readable storage means, totally or partially detachable as the case may be, storing a set of instructions executable by said computer to implement the assigning method as described here above.

The invention also relates to a manager node for a wireless network for the distribution of audio data contents comprising means for assigning a plurality of audio channels of an audio data content to a plurality of speakers, each of the speakers being associated with a distinct node, called a speaker node, of the wireless distribution network in the context of the diffusion of audio data content by a node, called a diffusion node, of the distribution network.

According to the invention, the means of assigning a plurality of audio channels comprise, for each speaker node called a first speaker node:

means of obtaining, for each speaker node, except the first speaker node, called a second speaker node, a piece of information on orientation of said reception antenna of said first speaker node, said antenna being adapted to the reception of data sent by the second speaker node through the wireless network for distribution of audio data contents;
means of assigning of one of the audio channels of said plurality of audio channels as a function of said piece of information obtained on orientation.

The advantages of the computer program product, storage means and manager node are substantially the same as those of the assignment method described here above and are there not taken up again here below.

Preferably, the means of assigning a plurality of audio channels furthermore comprise:
first means of identification of one of said speaker nodes, called an identified speaker node, to which one of said audio channels, called an identified audio channel, must be assigned as a function of said information on orientation obtained;
for each of said speaker nodes, except the identified speaker node, second means of identification of said speaker node to which one of said audio channels must be assigned depending on said pieces of information on orientation obtained and on the identified speaker node.

Advantageously, said identified speaker node is situated on an axis of symmetry of said distribution network.

Preferably, the means for assigning a plurality of audio channels comprise means for the obtaining, for each speaker node situated on said axis of symmetry, of a parameter indicating the level of reception, by the manager node, of data sent by said speaker node situated on said axis of symmetry, the obtaining means being activated if several speaker nodes are situated on said axis of symmetry and the first identification means are activated in taking account of said parameters obtained.

According to an advantageous characteristic of the invention, said audio data content distribution network is a home cinema type of network and said identified speaker is the speaker node associated with the speaker that has to restitute the front-centre channel of said home cinema network.

Advantageously for each speaker node, said reception antenna of said speaker node is a directional antenna whose radiation pattern is oriented along an axis of radiation,
said piece of information on orientation of the reception antenna of a first speaker node, the antenna being adapted to the reception of data transmitted by a second speaker node, is the angle formed by the axis of radiation of the reception antenna and a predetermined angle reference axis,
the first means of identification comprise means of determination, from angles obtained for each speaker node, of a speaker node with a maximum difference between a maximum signed angle value and a minimum signed angle value.

Preferably, for each speaker node, said reception antenna of said speaker node is a directional antenna whose radiation pattern is oriented along an axis of radiation,
said piece of information on orientation of the reception antenna of a first speaker node, the antenna being adapted to the reception of data transmitted by a second speaker node, is the angle formed by the axis of radiation of the reception antenna and a sound diffusion axis of the speaker associated with it,
the first identification means comprise means of determination, from angles obtained for each speaker node, of a speaker node for which the angles obtained are substantially symmetrical relative to the axis of sound diffusion of the speaker associated with it.

5. LIST OF FIGURES

Other features and advantages of the invention shall appear from the following description of a preferred embodiment of the invention given by way of a non-restrictive indication and from the appended drawings, of which:

Figure 5:
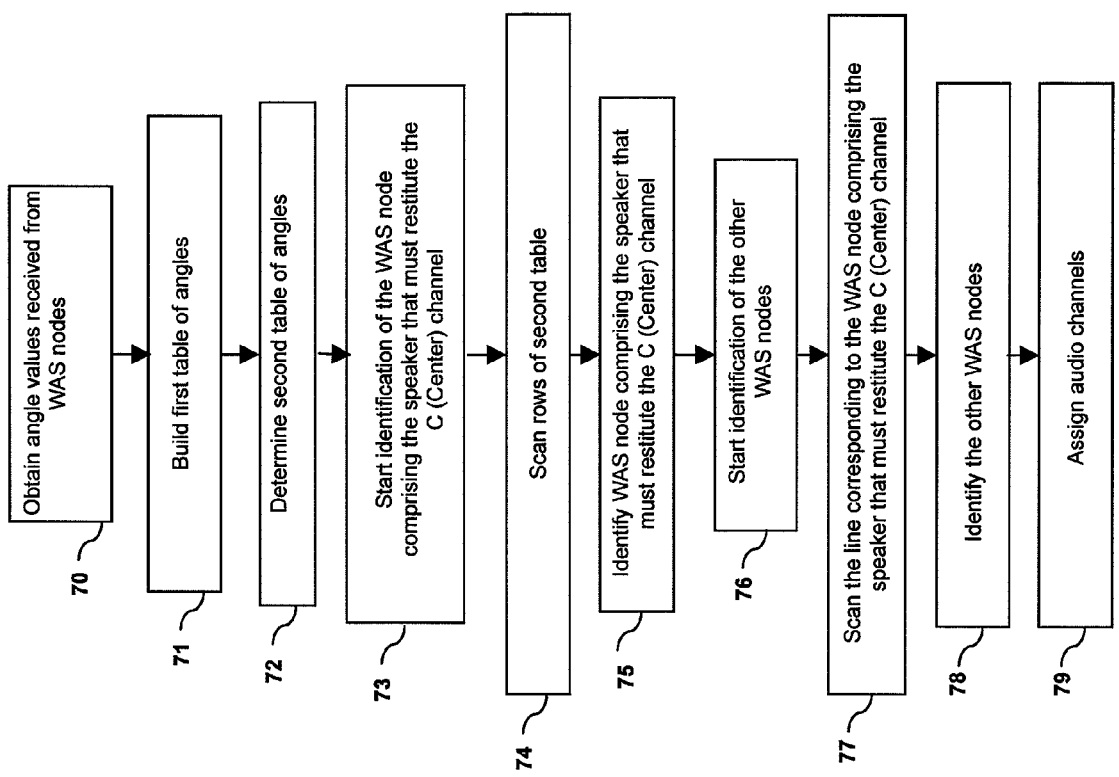

FIGS. 4A to 4C illustrate a first table of antenna angles built by the WSC node from values of angles received from the WAS nodes (FIG. 4A) and a second table of angles corresponding to the first table of angles in which 90° have been subtracted from each angle value (FIG. 4B) and illustrates, for each row of the second table corresponding to a given WAS node, the maximum and minimum signed angle values for a given WAS node (FIG. 4C);

FIG. 5 illustrates the main steps of an algorithm for identifying each of the WAS nodes of the network and assigning the appropriate audio channel to each of these WAS nodes according to the particular embodiment of the invention.

6. DESCRIPTION OF AN EMBODIMENT OF THE INVENTION

Figure 1:
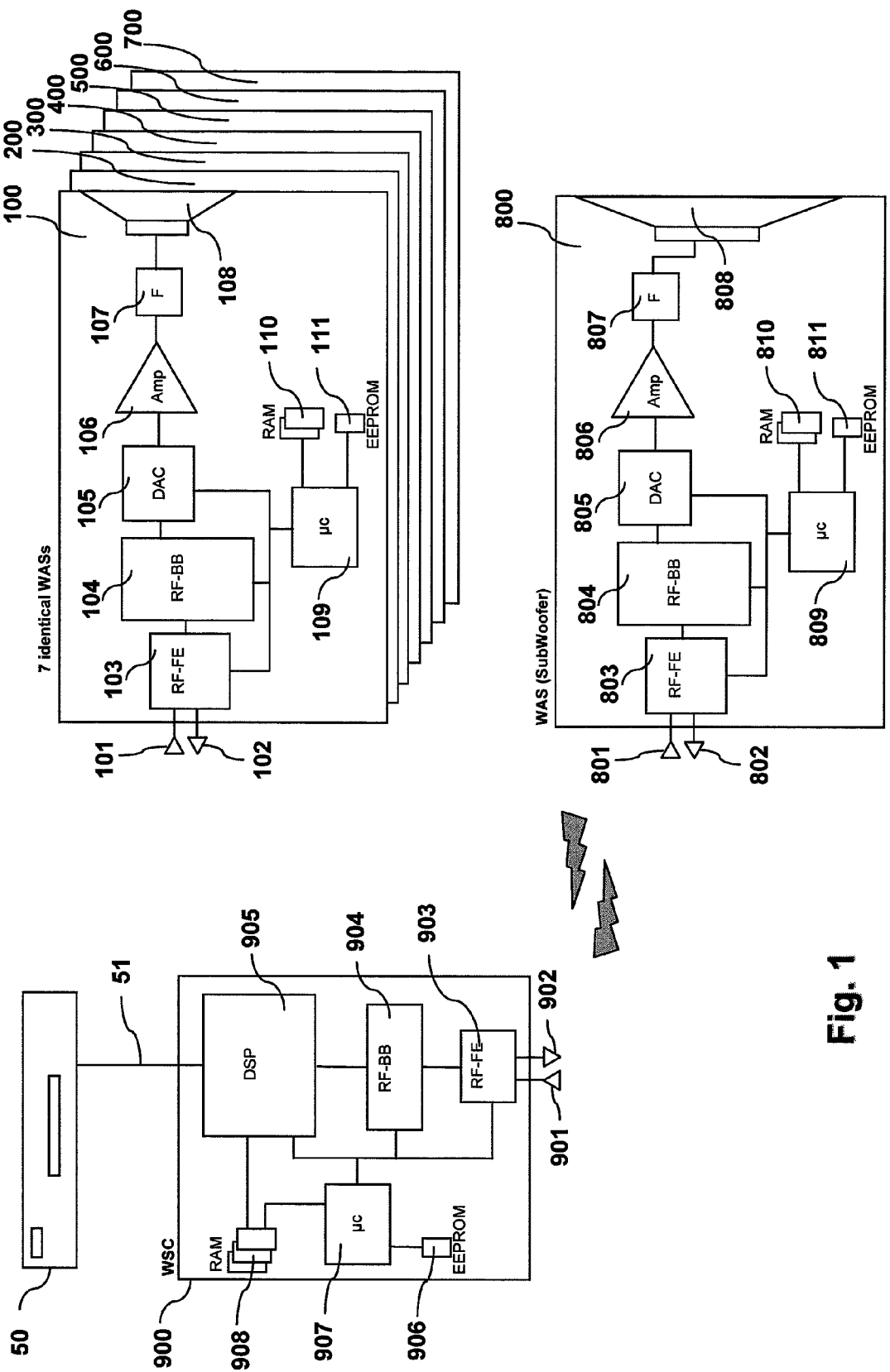
FIG. 1 is the drawing of a type 7.1 wireless home cinema network in which it is possible to implement a method of assignment according to a particular embodiment of the invention.

According to a particular application of the method of assignment according to a particular embodiment of the invention, the following description is situated in the context of a 7.1 type wireless home cinema or home theater network as illustrated in FIG. 1. Naturally, the invention can also be applied in the context of any wireless home cinema network such as a 5.1 type home cinema network.

Naturally, the method according to at least one other embodiment of the invention can also be implemented in any wireless network for the distribution of audio content in which it is necessary to identify nodes of the network in order to send them an appropriate piece of information.

For example, the 7.1 type wireless home cinema network is laid out in a room of a dwelling and comprises an audio-video source terminal 50 (for example a DVD player, a Blu-Ray player or again an HD-DVD player), a television screen (not shown), a wireless ambience (surround) controller 900 hereinafter designated as a WSC (wireless surround controller) node to which there are connected, via a wireless network, first 100, second 200, third 300, fourth 400, fifth 500, sixth 600, seventh 700 and eighth 800 wireless active speakers hereinafter designated as WAS nodes.

The wireless network enables the WSC node to transmit the data of the audio channel to be restituted to each of the WAS nodes, enables the WSC node to transmit commands to each of the WAS nodes for example during a discovery phase as described here below with reference to FIG. 3) and enables the WAS nodes to transmit data reception acknowledgements to the WSC. To carry out these operations of transmission, each of the nodes of the network has adjustable RF signal reception antennas.

Each WAS node comprises (or is associated with) a speaker which diffuses one audio channel among the following channels: FL (Front Left), FR (Front Right), C (Center) also called FC (Front Center), SL (Surround Left), SR (Surround Right), RL (Rear Left), RR (Rear Right), SW (subwoofer).

The SW (or subwoofer) channel is assigned to the WAS node 800 which comprises (or is associated with it) the subwoofer and can be easily distinguished from the other WAS nodes 100 to 700. Thus, in the context of the above-mentioned particular application, the identification of the WAS node 800 and the assigning of the SW channel to this WAS node 800 is done as a preliminary and the method of assignment according to a particular embodiment of the invention is implemented only on the first WAS node 100 to the seventh WAS node referenced 700.

The source terminal 50 sends the digital audio data pertaining to each audio channel to the WSC node 900 via a digital audio-video (or only audio) interface 51 which may be compliant for example with one of the following standards: SPDIF, IEEE-1394 or HDMI.

In the WSC node 900, the pieces of digital audio data from each audio channel are received and processed by a multi-channel audio decoder 905. The multi-channel audio decoder 905 is typically capable of decoding and decompressing the pieces of digital audio data from the six channels of a 5.1 system that are pre-encoded for example in the Dolby Digital format or DTS (Digital Theatre Sound) format or from the eight channels of a 7.1 system that are pre-encoded for example in the "Dolby True HD" (HD for high-definition) format or DTS HD (for Digital Theater Sound High Definition) format.

The multi-channel audio decoder 905 decodes and decompresses the digital audio data while at the same time demultiplexing the audio channels. A RAM 908 can be used by the multi-channel audio decoder 905 to carry out its decoding task. The multi-channel audio decoder 905 can also implement an audio DSP (Digital signal processor) to add delays to the audio channels or to add acoustic effects to the audio channels (for example in the context of an equalization). Then, the multi-channel audio decoder 905 sends the audio data from each audio channel to a RF baseband module 904.

The RF baseband module 904 inserts the audio data from each audio channel into frames. These frames typically consist of a header grouping together protocol information such as for example a frame number, an identification number corresponding to the WAS node to which the particular audio channel is assigned and an end-of-frame field grouping together error correction information such as for example a CRC (cyclical redundancy check).

Then the frames are modulated and delivered to a front-end RF module 903 so that it transmits them in a RF channel. The front-end RF module 903 carries out a digital/analog conversion on the frames, carries out an amplification on the frames and transmits the frames on a RF channel, for example a 60 GHz RF channel, using an antenna in transmission 902.

The WSC node 900 is also adapted to the reception of RF data coming from each WAS node by means of a antenna in reception 901. Thus, at reception, the front-end RF module 903 receives frames from an RF channel, for example a 60 GHz RF channel, amplifies these frames and performs an analog/digital conversion on these frames. Then the front-end RF module 903 sends the frames to the baseband RF module 904. The baseband module 904 extracts payload data from each frame coming from the WAS nodes which are for example, acknowledgements of reception, data on the antenna angles (as explained here below with reference to FIGS. 2A to 5) or even any piece of control information or status information.

The WSC node comprises a microcontroller 907 using one or more software programs implementing the invention. The microcontroller 907 is adapted for communication with and the control of the multi-channel audio decoders 905, baseband RF module 904 and a front-end RF module 903. The RAM 908 can be used by the microcontroller 907 to store temporary data necessary for accomplishing its different tasks. An EEPROM (or FLASH) type memory 906 stores different types of information such as a hardware identifier (or serial number) of the WSC node 900, user data, the total number of WAS nodes and their respective identifiers, the audio channel assigned to each WAS node, tables of antenna angles, etc.

The frames sent by the WSC node 900 are received by the WAS nodes 100 to 800. The WAS node 100 is described here below in detail. The WAS nodes 200 to 700 are not described because they are similar to the WAS node 100. The WAS node 800 has a shape very different from that of the WAS nodes 100 to 700. However, its internal structure is similar to that of the other WAS nodes 100 to 700 except for its audio reproduction stage which for its part is different. This audio reproduction stage of the WAS node 800 comprises an amplifier 806, a filter 807 and a speaker 808 dedicated to the reproduction of audio signals of a low frequency typically ranging from 20 Hz to 100 Hz. The position of the WAS node 800 is not of critical importance because the low-frequency audio signals are not directional. The subwoofer 800 is different from the other WAS nodes (it is of a different make and therefore cannot replace another WAS node or be replaced by another WAS node). In particular, it has a specific hardware identifier (or serial number) recorded in an EEPROM (or FLASH) type memory 811. The WSC node 900 can thus easily assign the SW (subwoofer) audio channel to the WAS node 800 using this specific hardware identifier.

For example, through a reception antenna 101, the WAS node 100 receives frames transmitted by the WSC node 900. The frames received by the reception antenna 101 are transmitted to a front-end RF module 103 of the WAS node 100. The front-end RF module 103 receives these frames coming from a RF channel, for example a 60 GHz RF channel, then amplifies these frames and performs an analog/digital conversion on these received frames. Then the front-end RF module 103 transmits these frames to a baseband RF module 104 which filters these frames: only the frames comprising an identification number corresponding to the channel assigned to the WAS node 100 (comprising an identifier of the WAS node 100) are kept. The other frames are discarded. Then, the baseband RF module 104 processes the frames that are kept and extracts the payload audio data from these frames. Through this mechanism, only the audio data corresponding to the audio channel assigned to the WAS node 100 are entered into a digital/analog converter 105 of the WAS node 100. The digital/analog converter 105 performs a digital/analog conversion on the audio data and delivers an analog audio signal to an amplifier 106. The frequency spectrum of this analog audio signal typically ranges from 100 Hz to 20 kHz. After amplification in the amplifier 106, the amplified analog audio signal is delivered to the speaker 108 of the WAS node 100 through a filter 107. The speaker 108 converts the analog audio signal into an acoustic signal.

The WAS node 100 is also adapted to sending RF data by means of a transmission antenna 102 to the WSC node 900. The baseband module 904 of the WSC node extracts payload data from each frame coming from the WAS node which are, for example, acknowledgements of reception, of data on angles of the antennas (as explained here below with reference to FIGS. 2A to 5) or even any piece of control or status information.

The WAS node 100 comprises a microcontroller 109 using one or more software programs implementing the invention. The microcontroller 109 is adapted for communication with and the control of the digital/analog converter 105, the baseband RF module 104 and the front-end RF module 103. A RAM 110 can be used by the microcontroller 109 to store the temporary data necessary for accomplishing its different tasks. An EEPROM (or FLASH) type memory 111 stores different types of information such as a hardware identifier (or serial number) of the WAS node 100, user data, the total number of WAS nodes and their respective identifiers, the audio channel assigned to each WAS node, tables of antenna angles, etc.

The following description is situated in the context of distribution in the 7.1 type wireless home cinema network, via the WSC node, of an application which is for example an audio application c0.

The method of assignment according to the invention (comprising especially the discovery phase described here below with reference to FIG. 3) is implemented in the form of a software program and/or a plurality of software sub-programs (comprising a plurality of algorithms described here below) executed in several machines of the 7.1 type home cinema network, for example in the WSC node 900 and in the WAS nodes 100 to 800.

Here below, the identification and assigning algorithm, described further below with reference to FIG. 5, is implemented in the WSC node (which is a manager node as understood in the invention). However, in other embodiment of the invention, it may be implemented in any other node or device of the network, for example in a WAS node.

Furthermore, the description is situated preferably with reference to the case where communications between the WAS and WSC nodes of the network are done via a 60 GHz RF channel, because such a channel has the following advantages:

it minimizes reflections on the walls of the room in which the network is placed;

it has a high bit rate.

However, such a channel has the drawback of limiting the distances on which the information is transmitted. To resolve this problem of limited transmission distance, in the context of the present particular application of the assignment method of the invention, the radiation pattern of the reception antenna of each of the nodes, namely the WSC node 900 and the WAS nodes 100 to 800, is chosen to be narrow (directional antenna) and adjustable (as explained here below with reference to FIGS. 2A and 2B). Thus each of the WSC nodes 900 and WAS nodes 100 to 800 comprises, to this end, a reception antenna that is directional and for which the orientation of the direction of the radiation pattern is tunable (i.e. the antenna is adjustable).

For example, the above-mentioned antennas (in reception and in transmission) are electromagnetic antennas constituted by a network of radiating elements which are controlled in phase and in amplitude so as to form a directional antenna for which the orientation is controlled.

Figure 2B:
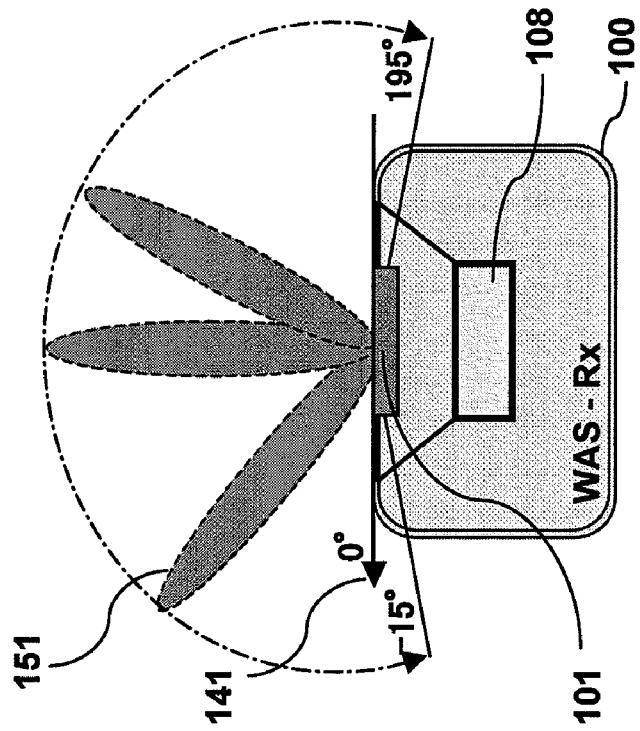
FIGS. 2A and 2B illustrate the transmission radiation pattern of the antenna in transmission (FIG. 2A) and the reception radiation pattern of the antenna in reception (FIG. 2B) for the WAS node 100 according to the particular embodiment of the invention.
Figure 2A:
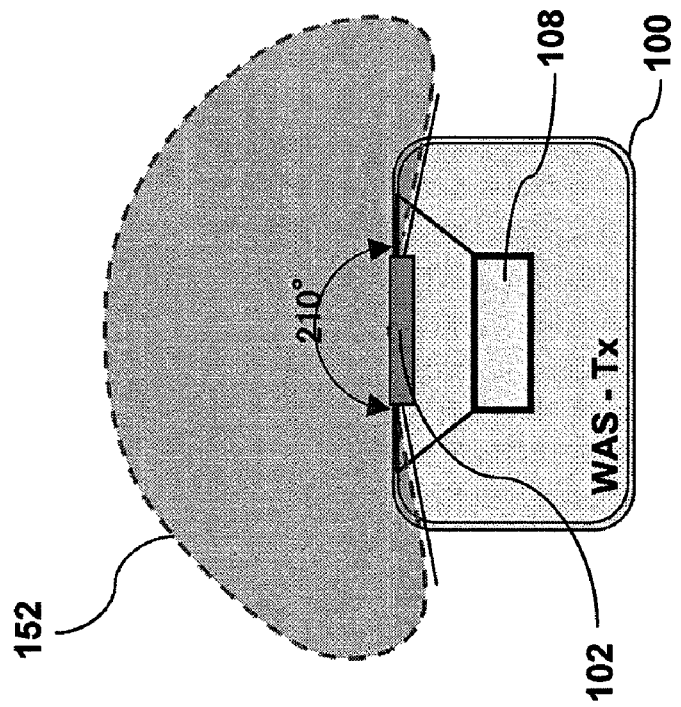

Referring to FIGS. 2A and 2B, we present the radiation pattern in transmission of the transmission antenna (FIG. 2A) and the radiation pattern in reception of the reception antenna (FIG. 2B) for the WAS node 100 according to the particular embodiment of the invention.

The transmission and reception antennas of each of the WAS nodes 200 to 700 are identical to the transmission and reception antennas of the WAS node 100 and are therefore not described.

FIG. 2A is a top view of the WAS node 100 when it transmits RF data. The transmission radiation pattern 152 coming from the transmission antenna 102 of the WAS node 100 is illustrated. This transmission radiation pattern 152 is oriented in the same direction as the acoustic signal reproduced by the speaker 108. The transmission antenna 102 is designed for the transmission of 60 GHz RF signals. The transmission antenna 102 has a wide radiation pattern in transmission in order to be able to reach a maximum number of nodes (WAS and WSC) of the network.

FIG. 2B is a top view of the WAS node 100 when it receives RF data. The reception antenna 101 of the WAS node 100 is a directional antenna whose reception radiation pattern 151 is oriented along an axis of radiation. This reception radiation pattern 151 is illustrated for three antenna angles formed by the axis of radiation and by an antenna angle reference axis 141 (proper to the WAS node 100), each WAS node possessing its own antenna angle reference axis (which is an axis contained in the plane of the membrane of the speaker of the WAS node 100 and oriented leftward in FIG. 2B).

The reception antenna 101 is designed for the reception of 60 GHz RF signals. The reception antenna 101 uses a classic beam-forming technique in order to form its reception radiation pattern 151 which is narrow (directional antenna) and adjustable (the orientation of the direction of the radiation pattern can be adjusted).

This beam-forming technique is used to increase the gain of the reception antenna 101 and thus attain the greatest distance of transmission between the nodes of the network.

The reception antenna 101 is an electromagnetic antenna consisting of a network of radiating elements controlled electrically in phase and in amplitude by the front-end RF module 103 in order to obtain a directional reception antenna whose reception radiation pattern 151 maybe oriented between an antenna angle of −15° and an angle of 195° in steps of 1°.

The angle of the reception radiation pattern 151 (or more specifically the angle formed by the axis of radiation of the reception radiation pattern and the angle reference axis 141) is adjusted with precision so as to find the best angle in order that the reception antenna 101 may be adapted to receiving data sent by a given node of the network which has to transmit data to the WAS node 100. Thus, the WAS node 100 can record the best angle in its EEPROM (or flash type) memory 111 for the reception of data coming from this given node.

Figure 3:
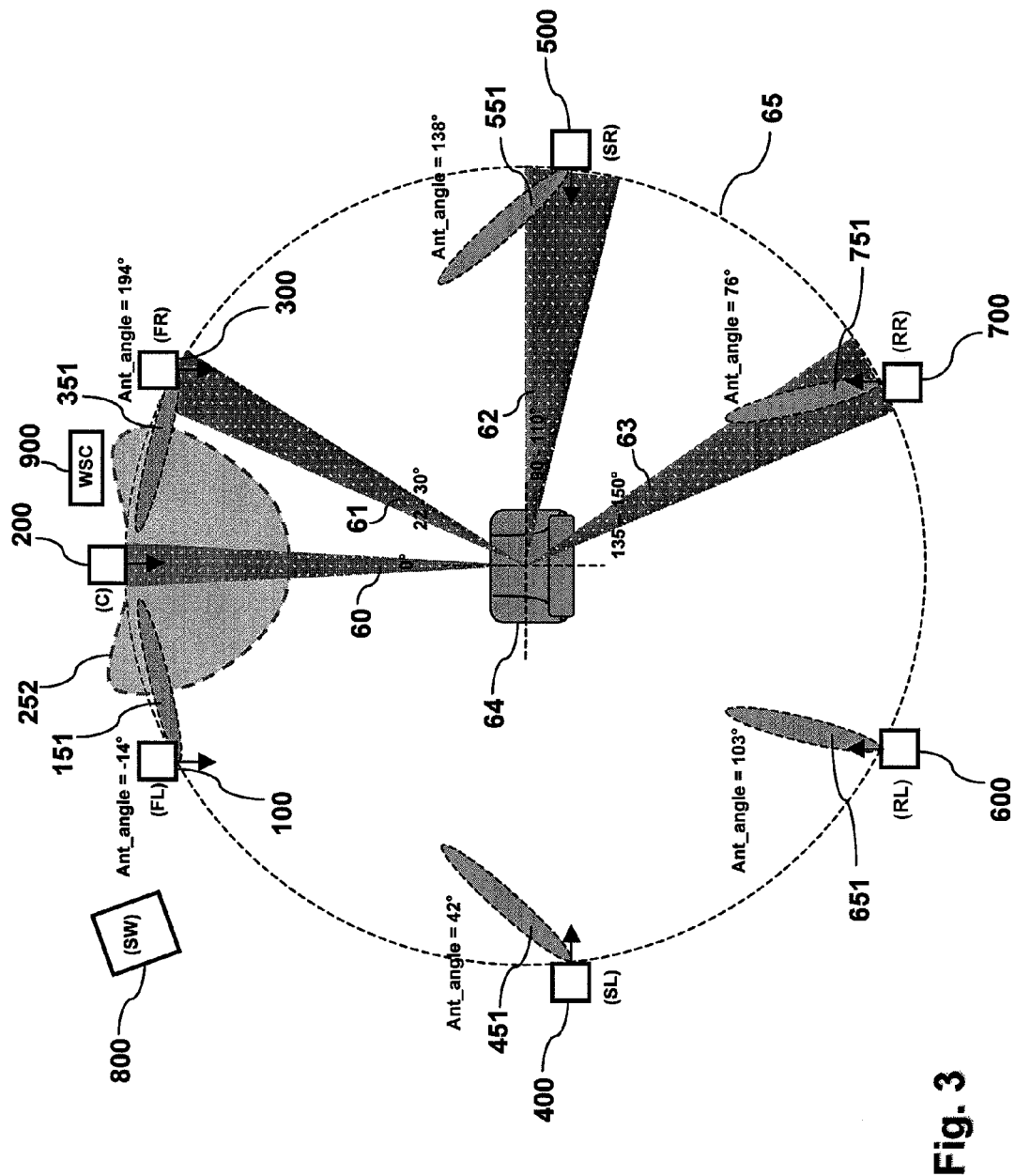
FIG. 3 illustrates a classic mode of positioning of the WAS and WSC nodes in the above-mentioned 7.1 type wireless home cinema network and illustrates a phase of discovery according to the particular embodiment of the invention.

FIG. 3 shows a classic positioning of the WAS nodes 100 to 800 and WSC node 900 in the above-mentioned 7.1 type wireless home cinema network and an illustration of a discovery phase according to the particular embodiment of the invention.

The WAS nodes 100 to 700 and their associated speakers are placed on the network in compliance with the recommendations of the ITU-R BS.775-2 standard. Thus, especially, the WAS nodes 100 to 700 and their associated speakers are placed at equal distance from the position of the listener and 64 around an imaginary circle 65 having a radius ranging from 2 m to 4 m.

Preferably, the speaker associated with the WAS node is included in this WAS node, thus ensuring that both the WAS node and its associated speaker are positioned in compliance with the recommendations of the ITU-R BS.775-2 standard. Should the speaker associated with a WAS node not be included in this WAS node, the WAS node is positioned above or beneath the speaker associated with it. In the rest of the description, the speaker associated with a WAS node is deemed to be concluded in this WAS node.

The WAS nodes 100 to 700 are placed on the above-mentioned circuit at angular positions according to the recommendations of Dolby Laboratories. Thus, for a 7.1 system in particular, the WAS node 200 comprising the speaker or associated with the speaker which must restitute the channel C is placed facing the position of the listener 64, in an angular zone of positioning 60 about a 0° angular positioning reference, the sense of travel on the circle from this angular positioning reference being the clockwise sense). The WAS node 300 comprising the speaker which must restitute the channel FR is placed in an angular positioning zone 61 ranging from 22° to 30° relative to the angular positioning reference. The WAS node 500 comprising the speaker which must restitute the channel SR is placed in an angular positioning zone 62 ranging from 90° to 110° relative to the angular positioning reference. The WAS node 700 comprising the speaker which must restitute the channel RR is placed in an angular positioning zone 63 ranging from 135° to 150° relative to the angular positioning reference.

The other WAS nodes 100, 400 and 600 respectively comprising the speakers which must restitute the FL, SL and RL channels are positioned so as to be substantially the nodes that are symmetrical, relative to an axis of symmetry passing through the WAS node 200 and through the listener, to the WAS nodes 300, 500 and 700. Indeed, the WAS nodes 100, 400 and 600 respectively comprising the speakers which must restitute the FL, SL and RL channels are generally not strictly speaking the nodes that are symmetrical, relative to an axis of symmetry passing through the WAS node 200 and through the listener, to the WAS nodes 300, 500 and 700. A certain degree of tolerance may be applied to the recommendations of the ITU-R BS.775-2 standard and of the Dolby Laboratories while at the same time complying with consistent spatial diffusion of the audio content in the home cinema system. Apart from this margin (which may be considered to be negligible relative to the other angles of orientation of reception antennas brought into play in the network) the WAS nodes 100, 400 and 600 are the nodes symmetrical, relative to an axis of symmetry passing through the WAS node 200 and through the listener, of the WAS nodes 300, 500 and 700.

The WAS node 800 which comprises the subwoofer is not concerned by the above-mentioned standard and recommendations because its position is not of critical importance. At the initialization of the 7.1 wireless home cinema network, the WSC node 900 differentiates the WAS node 800 from the other WAS nodes 100 to 700 through its specific hardware identifier (or serial number). Thus, the SW audio channel is assigned to the WAS node 800 by the WSC node 900.

At the initialization of the 7.1 wireless home cinema network, the WSC node 900 cannot directly differentiate the WAS nodes 100 to 700 because they are identical (having a same shape and same internal structure) and each of them can be assigned any one of the audio channels C, FR, FL, SR, SL, RR and RL. Thus, to assign the audio channels C, FR, FL, SR, SL, RR and RL to the appropriate WAS nodes, it is necessary to identify the WAS nodes according to their role defined by their placing (position) in space.

A description is provided here below of the discovery phase for the WAS nodes 100 to 700 implemented in the network just after the initialization of the 7.1 wireless home cinema network.

This phase brings into play each of the WAS nodes 100 to 700 one after the other in a pseudo-random sequence. Thus, the WAS nodes 100 to 700 will successively transmit in the network according to a schedule defined by the pseudo-random sequence.

For example, the WAS node 200 is the first in the pseudo-random sequence. Thus, it sends out a RF test signal of predetermined duration (the transmission radiation pattern 252 of the WAS node 200 when it sends this test signal is shown in FIG. 3) which is sufficient for each of the other WAS nodes 100, 300, 400, 500, 600, 700 to perform the step of matching the reception radiation pattern described here below.

During this transmission of the RF test signal, each of the other WAS nodes 100, 300, 400, 500, 600, 700 is in a reception mode according to which it adjusts the angle of its radiation pattern in order to find the best antenna angle so that its reception antenna is adapted to the reception of data transmitted by the WAS node 200.

As soon as they have found the best angle, each of the other WAS nodes 100, 300, 400, 500, 600, 700 stores this angle in their EEPROM (or FLASH type) memory. The reception radiation patterns 151, 351, 451, 551, 651 and 751 respectively of the WAS nodes 100, 300, 400, 500, 600, 700 are shown in FIG. 3 in the configuration of the best angle of their reception radiation pattern when the WAS node 200 transmits.

Thus for example the WAS node 100 stores the angular value of −14° associated with the transmission of the WAS node 200, . . . , the WAS node 700 stores the angle value of 76° associated with the transmission of the WAS node 200.

Then, each of the other WAS nodes 100, 300, 400, 500, 600, 700 in turn transmits a RF signal test in the network according to a pseudo-random sequence that the other WAS nodes can obtain and stores the value of their best angle when the WAS node transmits.

In one variant of the discovery phase of the WAS nodes 100 to 700, the WAS nodes transmit a pseudo-random RF sequence in which each node sends its hardware identifier (or serial number). The WSC node then collects the identifiers of the WAS nodes present in the network and once these identifiers are collected, they order each of the WAS nodes, in a determined sequence, to transmit a RF test signal during a given period. Then, according to the method described here above, each WAS node can obtain and store the value of its best angle of reception radiation pattern when each of the other WAS nodes transmits.

Then, as soon as each WAS node 100 to 700 has sent its test signal and as soon as the other nodes have stored their angle values, each WAS node transmits its angle values, thus obtained and stored, to the WSC node 900. Then, on the basis of these angle values, the WSC node builds the tables of angles presented here below with reference to FIGS. 4A and 4B.

Referring to FIGS. 4A and 4B, we present the first table of antenna built by the WSC node from the received values of angles of the WAS nodes 100 to 700 (FIG. 4A) and a second table of angles corresponding to the first table of angles in which 90° have been subtracted from each angle value (FIG. 4B).

This subtraction of 90° brings the 0° angular reference axis, for each WAS node, from the plane of the membrane of the node to the sound emission axis of the speaker of the WAS node in the direction of travel of the sound wave.

These first and second tables of angles are stored in the EEPROM (or FLASH type) memory 906 of the WSC node 900 then processed by the microcontroller 907 of the WSC node 900.

The WSC node 900 builds the first table by organizing the values of angles corresponding to the reception WAS nodes in rows and the values of angles corresponding to the transmission WAS nodes in columns. As a consequence, the different values of angles in reception of a given WAS node, when each of the other WAS nodes is in transmission, are obtained by reading the row corresponding to the given WAS node of the first table. The different values of reception angles of other WAS nodes when a given WAS node is in transmission are obtained by reading the column corresponding to the given WAS node of the first table.

The aim of the second table of angles is to facilitate the identification of the WAS node comprising the speaker which must restitute the channel C (this WAS node being positioned on an axis of symmetry of the network) and also the identification of the other WAS nodes comprising the speakers which must restitute the FL, FR, SL, SR, RL and RR channels.

FIG. 4C provides a representation, for each of row, of the second table of angles corresponding to a given WAS node, of the maximum and minimum signed angle values for the given WAS node.

FIG. 5 shows the main steps of an algorithm for identifying each of the WAS nodes 100 to 700 of the network and for assigning each of these WAS nodes the appropriate audio channel according to the particular embodiment of the invention. This algorithm, implemented by the microcontroller 907 of the WSC node 900 is stored in its EEPROM (or FLASH type) memory 906 or in a ROM type memory (not shown).

In a step 70, the WSC node 900 assembles together all the angle values received from each of the WAS nodes 100 to 700.

In a step 71, the WSC node 900 builds the first angle table (shown in FIG. 4A).

Then, in a step 72, the WSC node 900 subtracts 90° from each of the angular values of the first table, enabling it to obtain the second table (shown in FIG. 4B). Should the angle values given by the WAS nodes, during the discovery phase described here above with reference to FIG. 3, use the sound emission axis of their respective speakers in the direction of travel of the sound wave as the 0° angular reference axis, the step 72 is omitted.

Then, in a step 73, the WSC node 900 initializes the process of identification of the WAS node comprising the speaker which must restitute the channel C of the home cinema network (it is the node situated on the axis of symmetry of the network formed by the axis passing through the WAS node comprising the speaker having to restitute the channel C and through the listener).

In a step 74, the rows of the second table are scanned, for each row, the maximum signed angle value and minimum signed angle value are obtained and the difference between the maximum signed angle value and the minimum signed angle value is computed, as illustrated in FIG. 4C. Then, the computer differences are compared and the maximum value of these differences is selected.

The row and therefore the WAS node corresponding to this maximum difference is the WAS node comprising the centre speaker. Thus, the WAS node 200 is identified as being the WAS comprising the speaker which must restitute the canal C in a step 75.

In a step 76, the WSC node 900 initializes the process of identification of the other WAS nodes comprising the speakers which must restitute the FL, FR, SL, SR, RL and RR channels of the home cinema network.

In a step 77, the row of the WAS node 200 identified as the WAS node comprising the speaker which must restitute the channel C is analyzed, the signed antenna angle values of this row are arranged in order from the smallest to the biggest. The WAS nodes corresponding to the signed angle values thus ordered are respectively the WAS nodes comprising the speakers which must restitute the FR, SR, RR, RL, SL and FL channels.

Thus, the WAS nodes are identified by the WSC node 900 in a step 78 as follows:

the WAS node 300 is identified as being the WAS node comprising the speaker which must restitute the FR audio channel;

the WAS node 500 is identified as being the WAS node comprising the speaker which must restitute the SR audio channel;

the WAS node 700 is identified as being the WAS node comprising the speaker which must restitute the RR audio channel;

the WAS node 600 is identified as being the WAS node comprising the speaker which must restitute the RL audio channel;

the WAS node 400 is identified as being the WAS node comprising the speaker which must restitute the SL audio channel;

the WAS node 100 is identified as being the WAS node comprising the speaker which must restitute the FL audio channel.

Then, in a step 79, the WSC node 900 assigns each WAS node thus identified the audio channel appropriate to it.

Other solutions according to the invention may be implemented in order to identify the WAS nodes for example on the basis of algorithms using the first table of angles. Indeed, determining the second table of angles makes it possible to place the values of angles according to a reference system facilitating the identification of the WAS node comprising the speaker which must restitute the channel C then the identification of the other WAS nodes comprising the speakers which must restitute the channels FL, FR, SL, SR, RL and RR.

Other solutions according to the invention may also be implemented in order to identify the WAS nodes, for example on the basis of algorithms exploiting the symmetry of the second table of angles. Indeed, as already specified, the aim of the second table of angles as to facilitate the identification of the WAS node comprising the speaker which must restitute the channel C (this WAS node being positioned on an axis of symmetry of the network) and also the identification of the other WAS nodes. The obtaining of the angles in this specific reference system enables the WSC node to determine, from the angles obtained for each speaker node, the speaker node for which the angles attained are substantially symmetrical relative to the sound diffusion axis of the speaker associated with it. FIG. 4B shows that, in this reference system, in referring to the second row representing the WAS node 200 in reception, the WAS node 100 (the angle of antenna orientation of the WAS node 200 is at 75° when the WAS node 100 transmits) is substantially symmetrical to the WAS node 300 (the angle of orientation of the WAS node 200 is at −76° when the WAS node 300 transmits), the WAS node 400 (the angle of orientation of the antenna of the WAS node 200 is at 42° when the WAS node 400 transmits) is substantially symmetrical to the WAS node 500 (the angle of orientation of the antenna of the WAS node 200 is at 42° when the WAS node 500 transmits) and the WAS node 600 (the angle of orientation of the WAS node 200 is at 14° when the WAS node 600 transmits) is substantially symmetrical to the WAS node 700 (the angle of orientation of the antenna of the WAS node 200 is at −13° when the WAS node 700 transmits). The rows representing the other reception WAS nodes do not show such a symmetry.

In the context of other specific arrangements of the WAS nodes comprising the speakers in another network, additional parameters combined with the antenna angle values may be implemented to identify the speakers. For example, in the context of a network in which only one rear speaker is implemented, the RSSI (received signal strength indication) parameter may be used. In a 6.1 type system such as this, the audio channels to be restituted are: FC (Front Center), FL (Front Left), FR (Front Right), RC (Rear Center), RL (Rear Left) RR (Rear Right). The axis of symmetry passing through the WAS node comprising the speaker restituted in the FC channel and through the listener also passes through the WAS node comprising the speaker restituting the RC channel. The WSC node can then use the RSSI parameter indicating a level of reception of the RF signal to distinguish the WAS node comprising the speaker that has to restitute the FC channel of the WAS node comprising the speaker that has to restitute the RC channel. Indeed, the WAS node comprising the speaker that has to restitute the RC channel is situated at a position that is more distant than the WAS node comprising the speaker that has to restitute the FC channel, relative to the WSC node. The RSSI parameter associated with the reception of signals coming from the WAS node comprising the speaker that has to restitute the RC channel therefore has a value appreciably lower than that of the RSSI associated with the reception of signals coming from the WAS node comprising the speaker that has to restitute the FC channel.

The invention claimed is:

1. A method for assigning a plurality of audio channels of audio data content to a plurality of speakers, each of the speakers being associated with a different one of a plurality of N speaker nodes of a wireless network, the method being performed by a manager node of the wireless network, wherein the method comprises:

for each given speaker node from among the N speaker nodes, obtaining a piece of orientation information for each of N−1 other speaker nodes different from the given speaker node, regarding an orientation of a reception antenna of the given speaker node in a case that the reception antenna of the given speaker node is adapted to a reception of data sent by each of the N−1 other speaker nodes through the wireless network; and assigning a different one of the audio channels to a different one of the speaker nodes, as a function of N−1 pieces of orientation information obtained for each of the N speaker nodes.

2. The method according to claim 1, wherein the assigning includes:

identifying a reference speaker node, from among the speaker nodes, as a function of the N−1 pieces of orientation information obtained for each of the N speaker nodes;

assigning a reference audio channel, from among the audio channels, to the reference speaker node; and assigning a different one of the audio channels, other than the reference audio channel, to a different one of the speaker nodes, other than the reference speaker node, as a function of the N−1 pieces of orientation information obtained for each of the N speaker nodes, and the reference speaker node.

3. The method of assignment according to claim 2, wherein the reference speaker node is situated on an axis of symmetry of the wireless network.

4. The method according to claim 3, wherein, if two or more speaker nodes are situated on the axis of symmetry of the wireless network, the identifying of the reference speaker node includes:

obtaining, for each speaker node situated on the axis of symmetry, a parameter indicating a reception level, by the manager node, of data sent by each speaker node situated on the axis of symmetry, and selecting the reference speaker node, from among the speaker nodes situated on the axis of symmetry, based on the parameters obtained.

5. The method according to claim 3, wherein the wireless network is a home cinema type of network and the reference speaker node is associated with one of the speakers that is to be assigned a front-center channel of the home cinema network.

6. The method according to claim 2, wherein the reception antenna of each speaker node is a directional antenna having a radiation pattern oriented along an axis of radiation, wherein each piece of orientation information includes an angle formed by the axis of radiation of the reception antenna associated with the given speaker node and a predetermined angle reference axis, when the reception antenna associated with the given speaker node receives data transmitted by one of the N−1 other speaker nodes, and wherein the identifying of the reference speaker node includes determining based the angle included in each of the N−1 pieces of orientation information obtained for each of the N speaker nodes, the reference speaker node as a speaker node with a maximum difference between a maximum signed angle value and a minimum signed angle value.

7. The method according to claim 2, wherein, the reception antenna of each speaker node is a directional antenna having a radiation pattern oriented along an axis of radiation, wherein each piece of orientation information includes an angle formed by the axis of radiation of the reception antenna associated with the given speaker node and a sound diffusion axis of the speaker associated with the given speaker node when the reception antenna associated with the given speaker node receives data transmitted by one of the N−1 other speaker nodes, and wherein the identifying of the reference speaker node includes determining based on the angle included in each of the N−1 pieces of orientation information obtained for each of the N speaker nodes, the reference speaker node as a speaker node for which the angle included in each of the obtained N−1 pieces of orientation information are substantially symmetrical relative to an axis of sound diffusion of the speaker associated with the speaker node.

8. A non-transitory computer-readable storage medium storing instructions that, when executed a computer, cause the computer to perform a method for assigning a plurality of audio channels of audio data content to a plurality of speakers, each of the speakers being associated with a different one of a plurality of N speaker nodes of a wireless network the method being performed by a manager node of the wireless network, the method comprising:

for each given speaker node from among the N speaker nodes, obtaining a piece of orientation information for each of N−1 other speaker nodes different from the given speaker node, regarding an orientation of a reception antenna of the given speaker node, in a case that said antenna of the given speaker nodes is adapted to a reception of data sent by each of the N−1 other speaker nodes through the wireless network; and assigning a different one of the audio channels to a different one of the speaker nodes, as a function of N−1 pieces of orientation information obtained for each of the N speaker nodes.

9. A manager node of a wireless network, the manager node assigning a plurality of audio channels of audio data content to a plurality of speakers, each of the speakers being associated with a different one of a plurality of N speaker nodes of the wireless network the manager node comprising:

a wireless transceiver;

a microcontroller; and a memory storing instructions that, when executed by the microcontroller, cause the manager node to:

for each given speaker node from among the N speaker nodes, obtaining a piece of orientation information for each of N−1 other speaker nodes different from the given speaker node, regarding an orientation of a reception antenna of the given speaker node, in a case that the antenna is adapted to a reception of data sent by each of the N−1 other speaker nodes through the wireless network; and assigning a different one of the audio channels to a different one of the speaker nodes, as a function of N−1 pieces of orientation information obtained for each of the N speaker nodes.

10. The manager node according to claim 9, wherein the memory stores instructions that, when executed by the microcontroller, cause the manager node to:

identify a reference speaker node, from among the N speaker nodes, as a function of the N−1 pieces of orientation information obtained for each of the N speaker nodes;

assign a reference audio channel, from among the audio channels, to the reference speaker node; and assign a different one of the audio channels, other than the reference audio channel, to a different one of the speaker nodes, other than the reference speaker node, as a function of the N−1 pieces of orientation information obtained for each of the N speaker nodes, and the reference speaker node.

11. The manager node according to claim 10, wherein the reference speaker node is situated on an axis of symmetry of the wireless network.

12. The manager node according to claim 11, wherein the memory stores instructions that, when executed by the microcontroller, cause the manager node to:

obtain, for each speaker node situated on the axis of symmetry, of a parameter indicating a reception level, by the manager node, of data recieved by each speaker node situated on the axis of symmetry, and select the reference speaker node, from among the speaker nodes situated on the axis of symmetry, based on the parameter obtained for each speaker node situated on the axis of symmetry.

13. The manager node according to claim 11, wherein the wireless network is a home cinema type of network and reference speaker node is associated with the speaker that is to be assigned a front-center channel of the home cinema network.

14. The manager node according to claim 10, wherein the reception antenna of each speaker node is a directional antenna having a radiation pattern oriented along an axis of radiation, wherein each piece of orientation information antenna of a first speaker node includes an angle formed by the axis of radiation of the reception antenna associated with the given speaker node and a predetermined angle reference axis, when the reception antenna associated with the given speaker node receives data transmitted by one of the N−1 other speaker nodes, and wherein the memory stores instructions that, when executed by the microcontroller, cause the manager node to determine, based on the angle included in each of the N−1 pieces of orientation information obtained for each of the N speaker node nodes, the reference speaker node as a speaker node with a maximum difference between a maximum signed angle value and a minimum signed angle value.

15. The manager node according to claim 10, wherein the reception antenna of each speaker node is a directional antenna having a radiation pattern-is oriented along an axis of radiation,
   wherein each piece of orientation information includes an angle formed by the axis of radiation of the reception antenna associated with the given speaker node and a sound diffusion axis of the speaker associated with the given speaker node, when the reception antenna associated with the given speaker node receives data transmitted by one of the N−1 other speaker nodes,
   and wherein the memory stores instructions that, when executed by the microcontroller, cause the manager node to determine based on the angle included in each of the N−1 pieces of orientation information obtained for each of the N speaker nodes, the reference speaker node as a speaker node for which the angle included in each of the obtained N−1 pieces of orientation information are substantially symmetrical relative to an axis of sound diffusion of the speaker associated with the speaker node.

* * * * *